Aug. 2, 1955

W. M. JOHNSON

2,714,700

ELECTRIC POWER SYSTEM

Filed Jan. 25, 1954

2 Sheets-Sheet 1

Inventor
Wallace M. Johnson,
by Gilbert P. Tarleton
His Attorney.

Aug. 2, 1955 W. M. JOHNSON 2,714,700
ELECTRIC POWER SYSTEM
Filed Jan. 25, 1954  2 Sheets-Sheet 2

———— HIGH VOLTAGE
—·—·— LOW VOLTAGE 24ₐ
———— LOW VOLTAGE 24_b
------ LOW VOLTAGE 24_c

———— GENERATOR.
------ PHASE SHIFT TRANSFORMER 28.
———— PHASE SHIFT TRANSFORMER 29.

Inventor
Wallace M. Johnson,
by Gilbert P. Tarleton
His Attorney.

United States Patent Office 2,714,700
Patented Aug. 2, 1955

2,714,700

ELECTRIC POWER SYSTEM

Wallace M. Johnson, Pittsfield, Mass., assignor to General Electric Company, a corporation of New York Application January 25, 1954, Serial No. 405,871

12 Claims. (Cl. 321—57)

This invention relates to apparatus whereby generated electric power of nine phases or more is converted to three-phase outgoing power; more particularly, the invention relates to apparatus for transforming nine-phase generated power to three-phase power.

It has long been known that a generator having an output of more than three phases would provide a very effective use of the generator materials. However, beyond three phases the complexity of distribution more than offsets the improved efficiency of generation and therefore, the distribution of electric power is almost always on a three-phase basis. Accordingly, it is one of the objects of this invention to provide apparatus whereby generated power of nine phases or more may be efficiently transformed into three-phase power.

It is another object of the invention to provide apparatus which will obtain transformation from a nine-phase to a three phase power system with balanced currents and balanced voltage regulation.

Figure 1:
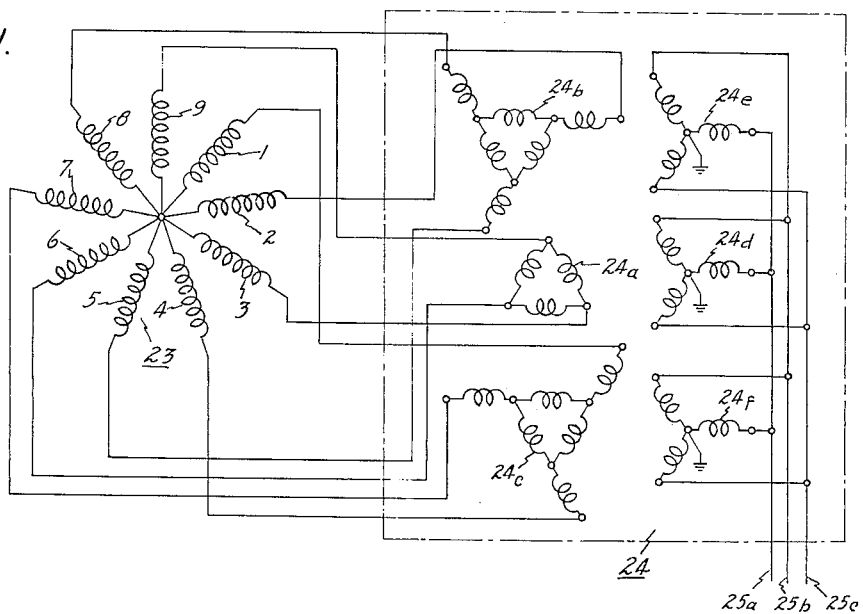
Figure 2:
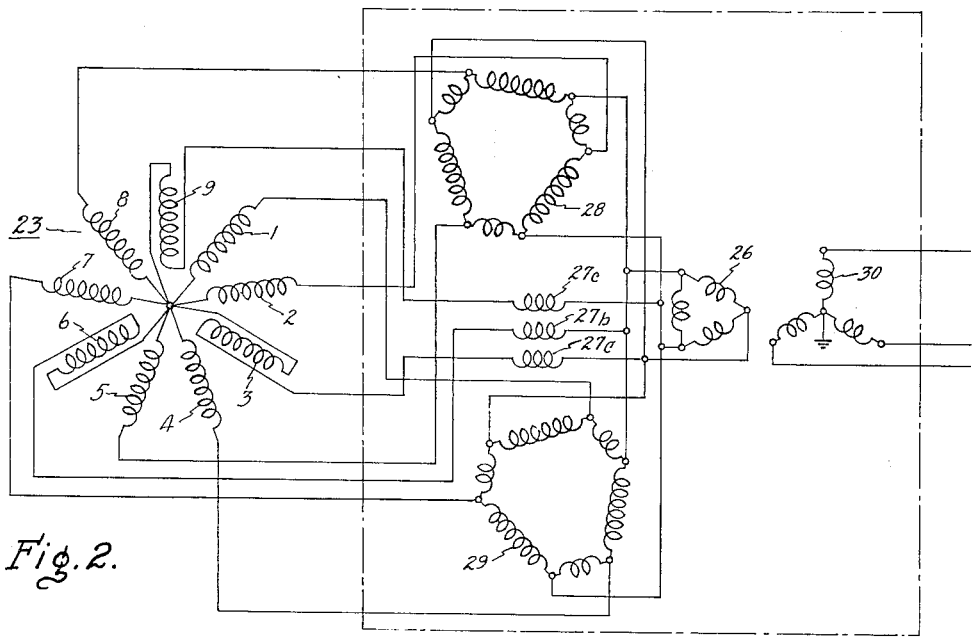
Figure 3:
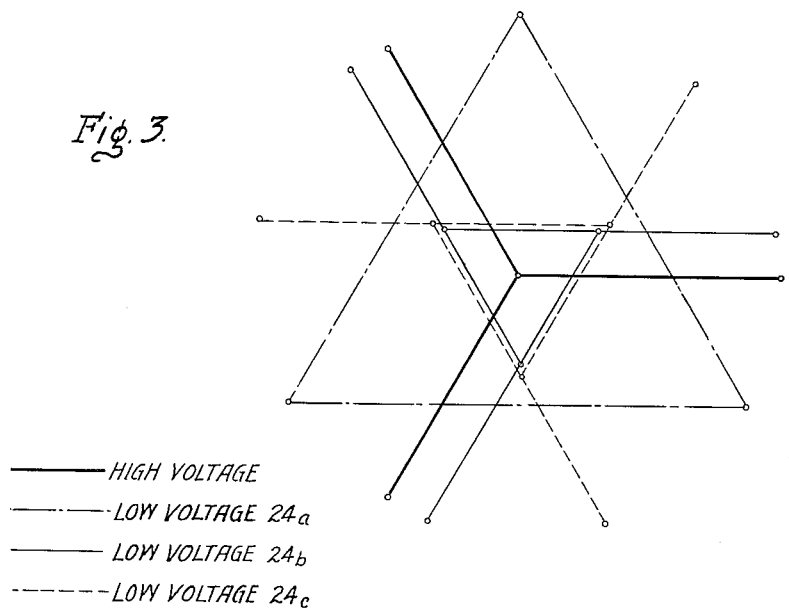
Figure 4:
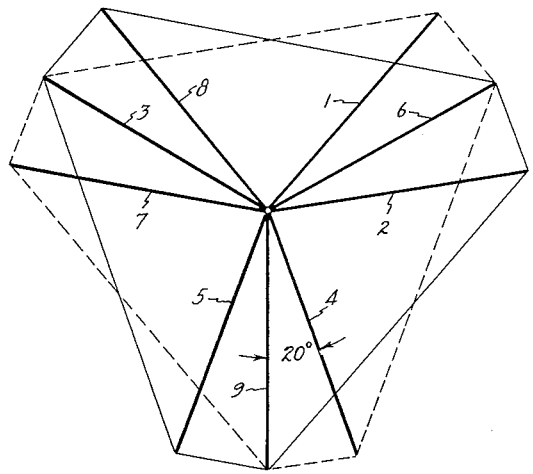

Other objects of the invention will be apparent from the following specification taken in connection with the attached drawing in which Fig. 1 is a circuit diagram illustrating one embodiment of this invention; Fig. 2 is a circuit diagram of an alternative embodiment; Fig. 3 is a voltage vector diagram of the apparatus of Fig. 1; and Fig. 4 is a voltage vector diagram of the embodiment of Fig. 2.

Briefly stated, in accordance with one of its aspects, this invention is directed to an electric power system having an alternating current generator operable to produce symmetrical nine-phase power, and means for transforming this nine-phase power to three-phase power comprising a first three-phase circuit to which three of the nine generated phases spaced at intervals of 120 electrical degrees are connected, a second three-phase circuit connected to three of the remaining six generated phases at intervals of 120 electrical degrees, means for shifting the second three-phase circuit into phase with the first three phase circuit a third three-phase circuit connected to the three remaining generated phases, and means for shifting the third three-phase circuit into phase with the first three-phase circuit.

In Fig. 1 an alternating current generator 23 delivers nine-phase power, the nine phases being shown conventionally as indicated by the radial coils numbered 1 to 9 in clockwise order positioned to 40° intervals. The generator 23 may be conventional in all respects except that the armature windings are connected to deliver nine-phase power instead of the usual three-phase. Accordingly, the generator will not be further described herein.

Connected to the nine phases of the generator 23 is a transformer assembly 24, consisting essentially of three three-phase transformers, which is arranged to transform the nine phases of input power to a three-phase output. This is accomplished by connecting the three-phase primary 24a to the generator phases 3, 6 and 9, which are at spaced intervals of 120 electrical degrees, and the three-phase primary windings 24b and 24c in 40° phase-shift relationship to the remaining six generated phases whereby two of each of these generated phases are brought into phase with each of the windings constituting the primary winding 24a. Thus, the generated phases 2, 5 and 8, which are connected to the primary winding 24b, are advanced 40° by the extended delta phase-shift arrangement and the generated phases 1, 4 and 7 are retarded 40° by connection in extended delta relationship to the primary winding 24c. Other well known phase-shift arrangements may also be used.

While the three windings of the primary 24a are shown connected in delta electrical relation those skilled in the art will realize that a wye connection is also feasible for these windings provided the phase shift connections are changed to give the appropriate phase relationship. The magnitude of the phase shift brought about by the windings 24b and 24c depends upon the turns ratio of the portion of each individual winding within the delta to the portion of the winding extended beyond the delta. To bring about a 40° phase shift the turns ratio for one of the individual windings of the primary 24a to the portion of one of the individual windings inside the delta of 24b to the portion of one of the windings of 24b extended beyond the delta is 1.0:0.347:0.395.

The extended delta windings of the primaries 24b and 24c require only a 3.2% increase in physical kva. as compared to a conventional delta-connected winding.

The transformer assembly 24 includes three conventional three-phase high voltage secondary windings 24d, 24e, and 24f. Due to the phase shift brought about by the extended delta windings of the primaries 24b and 24c there are a total of only three phases in the nine individual windings constituting the secondary windings. All of the in-phase windings may be connected in parallel to provide a single three-phase outgoing circuit as shown by the conductors 25a, 25b, and 25c. While the high voltage secondary windings 24d, 24e, and 24f are shown as wye connected those skilled in the art will realize that these windings could also be connected in delta electrical relation.

The transformer sub units 24a–24d, 24b–24e, 24c–24f may be physically separated but they are designed to have the same overall impedance in order to assure balanced voltages and equal load division among all nine phases of generated power. Thus, I have provided a phase transformation arrangement in which the transformers use conventional high voltage windings and the utilization of the generator is 100%. These advantages are obtained at the cost of a very small increase in transformer kva. The voltage vector diagram of Fig. 3 illustrates the effect of the phase shift connection of the primary windings 24b and 24c in retarding or advancing six phases to bring them into synchronous phase with the three phases of the winding 24a.

The embodiment of Fig. 2 separates the phase-shift from the step-up transformer bank and thus allows complete flexibility in the selection of step-up transformers. However, this is accomplished only by providing a somewhat greater transformer kva. than is necessary for the embodiment of Fig. 1. The arrangement of Fig. 2 brings two of the phase groups to the generator through two 1–1 voltage ratio 20° phase shift autotransformers. The third phase group is brought through a series reactor to balance the impedance drop of the phase shift transformers. The three phase groups are then tied together on a common low-voltage bus. As in the case of Fig. 1, the generator 23 delivers nine phases of power but phases 3, 6, and 9 are reverse-connected to a delta 26 through the reactors 27a, 27b, and 27c, respectively, the result of the reverse connection being that only a 20° phase-shift need be brought about on the other six generated phases by a pair of autotransformers 28 and 29. The reverse connections of the windings 3, 6 and 9 have the effect of displacing these phases by 180°. Thus, for example, the autotransformer 28 retards the phase 5 by 20° and the autotransformer 29 advances the phase 4 20° to bring both into phase with phase 9. Similarly, the phases 7 and 8 are brought into phase with the phase 3 and the phases 1 and 2 are brought into phase with the phase 6.

The physical kva. of each of the 20° phase-shift autotransformers 28 and 29 may be approximately 10% of the generator kva. Since these autotransformers may be insulated for the generator voltage only they may be made relatively small and it is feasible to put both autotransformers in a single tank. The 20° phase shift in six of the windings of the generator 23 of Fig. 2 is accomplished by proper adjustment of the turns ratio of the windings forming the hexagons of the autotransformers 28 and 29. Once the phase shift is accomplished, the windings of the autotransformers 28 and 29 are connected to those windings of the delta 26 with which they are in phase. In contrast to the embodiment of Fig. 1 this arrangement enables the nine phases of the generator 23 to be transformed to three phases with the use of a single three-phase secondary winding 30. Where no change in voltage output is required the secondary may be omitted and line connections may be made directly on the primary side. While it is preferred that the secondary 30, which normally accomplishes a step-up in voltage, be wye-connected, those skilled in the art will recognize that a delta connected secondary could also be used.

Fig. 4 is a voltage vector diagram of the embodiment illustrated in Fig. 2. The generated phases 1 to 9 are indicated by the appropriate numeral on this diagram. The turns ratio of the long and short windings of the autotransformers to bring about a 20° shift is about 4.4 to 1 as shown by the comparative lengths of the vectors of Fig. 4.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. In apparatus for transforming generated power of nine phases separated from each other at intervals of forty electrical degrees to three phases separated from each other at intervals of 120 electrical degrees, a first group of three primary windings connected to three symmetrical phases of the nine phases in delta electrical relation, two additional groups of primary windings connected in phase-shift relation respectively to the two remaining sets of three symmetrical phases to bring the remaining six phases into electrical orientation with said delta, and a plurality of secondary windings inductively coupled to said primary windings to provide three phase power.

2. In an electric power system, an alternating current generator operable to produce symmetrical nine-phase power, and means for transforming said nine-phase power to three-phase power, said means comprising a first group of primary windings connected to three symmetrical phases of the nine phases in delta electrical relation, two additional groups of primary windings connected in phase-shift relation with respect to said delta respectively to the two remaining sets of three symmetrical phases to bring the remaining six phases of said generator into parallel electrical orientation with said delta, and a plurality of secondary windings inductively coupled to said primary windings.

3. In an electric power system, an alternating current generator operable to produce symmetrical nine-phase power, and means for transforming said nine-phase power to three-phase power, said means comprising a first, second, and third group of three-phase primary windings, the first of said groups being connected in-phase to three symmetrical phases of said nine generated phases and the second and third of said groups having phase-shift connections respectively to the remaining two sets of three symmetrical phases whereby said six remaining phases are brought into phase with the first group of primary windings, and a plurality of secondary windings inductively coupled to said primary windings.

4. Apparatus for transforming symmetrical nine-phase power to three-phase power comprising a first, second and third group of three-phase primary windings, the first of said groups being connected in delta electrical relation to a first set of three symmetrical phases of said nine phases, and the second and third of said groups having phase shift connections respectively to the remaining two sets of three symmetrical phases to shift out-of-phase incoming power into phase with the windings of said first group, and a plurality of secondary windings inductively coupled to said primary windings.

5. In an electric power system, an alternating current generator operable to produce symmetrical nine-phase power, a first, second and third group of three-phase primary windings, the first group of primary windings being connected to three of the phases of said generator at spaced intervals of 120 electrical degrees, and the second and third of said groups having phase-shift connections respectively to the remaining two sets of three symmetrical phases of said nine phases to shift said remaining phases into phase with the phases of said first group, and a plurality of secondary windings inductively coupled to said primary windings.

6. In an electric power system, an alternating current generator operable to produce symmetrical nine-phase power, a three-phase first primary winding reversely connected to three phases of said nine-phase generator at spaced intervals of 120 electrical degrees, a first phase-shift autotransformer adapted to shift three symmetrical phases of the six remaining phases into phase with said first primary winding, a second phase-shift autotransformer adapted to shift the three remaining symmetrical phases into phase with said first primary winding, and a three-phase secondary winding inductively coupled to said first primary winding.

7. In an electric power system, an alternating current generator operable to produce symmetrical nine-phase power, a three-phase first primary winding reversely connected to three phases of said nine-phase generator at spaced intervals of 120 electrical degrees, a first 20-degree phase-shift autotransformer connected to three of the remaining six phases at spaced intervals of 120 electrical degrees, a second 20-degree phase-shift autotransformer connected to the three remaining phases, the 20-degree phase shifts of said autotransformers being in opposite directions to shift said six phases into phase with said first primary winding, circuits connecting the windings of said autotransformers to the windings of said first primary winding having the same electrical orientation, and a three-phase secondary winding coupled to said first primary winding.

8. In an electric power system, an alternating current generator operable to produce symmetrical nine-phase power, a three-phase first primary winding in delta electrical relation reversely connected to three phases of said nine-phase generator at spaced intervals of 120 electrical degrees, a reactor in series in the line connected to each winding of said delta, a first 20-degree phase shift autotransformer connected to three of the remaining six phases at spaced intervals of 120 electrical degrees, a second 20-degree phase-shift autotransformer connected to the three remaining phases, the 20-degree phase shifts of said autotransformers being in opposite directions to shift said six phases into phase with said first primary winding, circuits connecting the windings of said autotransformers to the windings of said delta having the same phase, and a three-phase secondary winding coupled to said first primary winding.

9. In an electric power system, an alternating current generator operable to produce symmetrical nine-phase power, means to transform said nine-phase power to three-phase power comprising a first, second and third three-phase primary winding, the first of said windings being connected in-phase with three of said nine phases at spaced intervals of 120 electrical degrees, the second and third of said windings being connected in extended delta electrical relation respectively to the remaining two sets of three phases at spaced intervals of 120 electrical degrees to bring said six phases into phase with said first three-phase primary winding, a three-phase secondary winding for each of said three-phase primary windings, and a circuit connecting in series the in phase portions of said secondary windings to give an output having a total of three phases.

10. An electric power system as claimed in claim 9 in which the three secondary windings are wye connected.

11. In an electric power system, a nine phase alternating current generator operable to produce symmetrical nine-phase power, means including three windings connecting three phases of said nine-phase generator at spaced intervals of 120 electrical degrees into a first group in symmetrical three-phase relationship, phase shift means connecting the remaining six phases of said nine-phase generator into a second and third group, each group consisting of three phases spaced at intervals of 120 electrical degrees, said phase shift means serving to shift the phase of said second and third groups into phase with said first group, a three phase output circuit and means for coupling said output circuit, said three windings and said phase shift means for delivering the power output of said generator.

12. In apparatus for transforming symmetrical nine-phase generated power to three phase power, a first group of three primary windings connected in delta electrical relation, a second group of three primary windings connected in extended delta electrical relation to give a phase shift of forty electrical degrees leading, a third group of three primary windings connected in extended delta electrical relation to give a phase shift of forty electrical degrees lagging said first, second, and third groups of primary windings being connected respectively to first, second and third sets of three symmetrical phases of said nine-phase power, the second set of three symmetrical phases lagging said first set, and the third set of three phases leading said first set, and providing a total of three phases of primary power, a three-phase secondary winding for each group of primary windings, and a circuit connecting the secondary windings having the same electrical orientation to provide three-phase outgoing power.

References Cited in the file of this patent

UNITED STATES PATENTS

| 2,307,527 | Maslin | Jan. 5, 1943 |
| 2,334,045 | Temple | Nov. 9, 1943 |